(12) United States Patent
Hu

(10) Patent No.: US 10,447,136 B2
(45) Date of Patent: Oct. 15, 2019

(54) DRIVING APPARATUS AND DEVICE FABRICATION METHOD

(71) Applicant: BOLYMEDIA HOLDINGS CO. LTD., Santa Clara, CA (US)

(72) Inventor: Xiaoping Hu, Shenzhen (CN)

(73) Assignee: BOLYMEDIA HOLDINGS CO. LTD., Santa Clara, CA (US)

( * ) Notice: Subject to any disclaimer, the term of this patent is extended or adjusted under 35 U.S.C. 154(b) by 424 days.

(21) Appl. No.: 15/109,119

(22) PCT Filed: Apr. 18, 2014

(86) PCT No.: PCT/CN2014/075709
§ 371 (c)(1),
(2) Date: Jun. 29, 2016

(87) PCT Pub. No.: WO2015/100883
PCT Pub. Date: Jul. 9, 2015

(65) Prior Publication Data
US 2016/0329801 A1 Nov. 10, 2016

(30) Foreign Application Priority Data
Dec. 31, 2013 (CN) .......................... 2013 1 0748592

(51) Int. Cl.
*G02B 7/02* (2006.01)
*H02K 41/035* (2006.01)
(Continued)

(52) U.S. Cl.
CPC ........... *H02K 41/0356* (2013.01); *G02B 7/09* (2013.01); *G03B 5/00* (2013.01); *G03B 13/36* (2013.01);
(Continued)

(58) Field of Classification Search
CPC ..... H02K 99/20; H02K 33/02; H02K 41/0356
See application file for complete search history.

(56) References Cited

U.S. PATENT DOCUMENTS 6,674,352 B2 1/2004 Montuschi et al.
8,134,259 B2 3/2012 Choi
(Continued)

FOREIGN PATENT DOCUMENTS

| AU | 2014375953 B2 | 7/2016 |
| CN | 2385468 | 6/2000 |

(Continued)

OTHER PUBLICATIONS

International Search Report for PCT/ CN2014/075709 dated Dec. 29, 2014 and its English translation provided by WIPO.
(Continued)

*Primary Examiner* — Alicia M Harrington
(74) *Attorney, Agent, or Firm* — Ladas & Parry, LLP

(57) ABSTRACT

A driving apparatus comprises a stator (21), a rotor (22) and a deformation connector (23). The rotor is connected to the stator through the deformation connector. An external driving force drives the deformation connector to have deformation so that the rotor changes its position with respect to the stator. Under the condition that no external driving force is applied, the deformation connector remains at a force balanced position (x0). The force on the deformation connector comprises a deformation force (F1) of the deformation connector and a first primitive force (F2) in opposite direction to the deformation force (F1). Also provided is a device fabrication method. Because the deformation connector keeps balance under the effect of the deformation force and the first primitive force, a small external driving force is required when the driving apparatus operates near the balance point, hereby reducing power consumption.

7 Claims, 6 Drawing Sheets

(51) Int. Cl.
  *H02K 33/02* (2006.01)
  *H02K 99/00* (2014.01)
  *G02B 7/09* (2006.01)
  *G03B 5/00* (2006.01)
  *G03B 13/36* (2006.01)
  *H02K 15/16* (2006.01)

(52) U.S. Cl.
  CPC ............. *H02K 15/16* (2013.01); *H02K 33/02* (2013.01); *H02K 99/20* (2016.11); *G03B 2205/0046* (2013.01); *G03B 2205/0069* (2013.01)

(56) References Cited

U.S. PATENT DOCUMENTS

| | | |
|---|---|---|
| 2002/0050897 A1 | 5/2002 | Montuschi et al. |
| 2002/0172060 A1 | 11/2002 | Takeuchi |
| 2004/0183487 A1 | 9/2004 | Ueda et al. |
| 2007/0096602 A1 | 5/2007 | Matsuki |
| 2010/0164662 A1 | 7/2010 | Sohn |
| 2011/0133578 A1 | 6/2011 | Choi |
| 2013/0241322 A1 | 9/2013 | Lee et al. |
| 2016/0329801 A1 | 11/2016 | Hu |

FOREIGN PATENT DOCUMENTS

| | | |
|---|---|---|
| CN | 1551466 A | 12/2004 |
| CN | 101771328 A | 7/2010 |
| CN | 102088235 | 6/2011 |
| CN | 103312110 | 9/2013 |
| EP | 1167749 A1 | 1/2002 |
| EP | 1450471 A1 | 8/2004 |
| EP | 2127058 A2 | 12/2009 |
| EP | 2204825 A2 | 7/2010 |
| EP | 3082237 A1 | 10/2016 |
| JP | S52-169673 U | 12/1977 |
| JP | S54-94813 U | 7/1979 |
| JP | H04-293005 A | 10/1992 |
| JP | H09-84323 A | 3/1997 |
| JP | 2004-187429 A | 7/2004 |
| JP | 2007-17706 A | 1/2007 |
| JP | 2007-129821 A | 5/2007 |
| KR | 20040075781 A | 8/2004 |
| KR | 10-2009-0081855 A | 7/2009 |
| KR | 2010-0007092 U | 7/2010 |
| KR | 10-2011-0027173 A | 3/2011 |
| KR | 20130105357 | 9/2013 |
| KR | 1439937 | 9/2014 |
| RU | 105090 U1 | 5/2011 |
| WO | 2008/064754 A2 | 6/2008 |
| WO | 2013137578 | 9/2013 |
| WO | 2015100883 A1 | 7/2015 |

OTHER PUBLICATIONS

Written Opinion for PCT/CN2014/075709 dated Dec. 29, 2014 and its English translation.
International Preliminary Report on Patentability (Chapter 1) for PCT/CN2014/075709 dated Jul. 5, 2016 and its English translation.
From AU 2014375953, Notice of Allowance dated Nov. 15, 2017.
From AU 2014375953, Office Action dated Apr. 7, 2017.
From AU 2014375953, Office Action dated Sep. 15, 2017.
From CA 2,933,918, Notice of Allowance dated Mar. 23, 2018.
From CA 2,933,918, Office Action dated Apr. 19, 2017.
From CN 201310748592.0, Notice of Allowance dated Aug. 17, 2018 with English translation from Google.
From CN 201310748592.0, Office Action with Search Report dated Sep. 19, 2016 with English translation from Global Dossier.
From CN 201310748592.0, Office Action dated May 15, 2017 with English translation from Global Dossier.
From CN 201310748592.0, Office Action dated Nov. 16, 2017 with English translation from Global Dossier.
From CN 201310748592.0, Office Action with Search Report dated May 3, 2018 with English translation from Global Dossier.
From EP 14876940.9, Supplementary European Search Report and Search Opinion dated May 12, 2017.
From JP 2016-561054, Notice of Allowance dated Apr. 3, 2018 with English translation from Google translate.
From JP 2016-561054, Office Action dated Aug. 1, 2017 with English translation from Google translate.
From KR 10-2016-7020389, Notice of Allowance dated Aug. 7, 2018 with English translation from Global Dossier.
From KR 10-2016-7020389, Notice of Refusal dated Mar. 7, 2018 with English translation from Global Dossier.
From KR 10-2016-7020389, Office Action dated Aug. 21, 2017 with English translation from Global Dossier.
From KR 10-2016-7020389, Office Action dated May 9, 2018 with English translation from Global Dossier.
From NZ 721989, Notice of Allowance dated May 3, 2017.
From NZ 721989, Office Action dated Aug. 25, 2016.
From RU2016129892, Notice of Allowance dated Jan. 17, 2018 with English translation from Google.
From RU2016129892, Office Action dated Sep. 6, 2017 with English translation from Google.

DRIVING APPARATUS AND DEVICE FABRICATION METHOD

CROSS-REFERENCE TO RELATED APPLICATIONS

This application is the U.S. National Stage of International Patent Application No. PCT/CN2014/075709 filed on Apr. 18, 2014, which claims priority to Chinese Patent Application No. 201310748592.0 filed on Dec. 31, 2013, the disclosures of which are hereby incorporated by reference in their entireties.

TECHNICAL FIELD

The present disclosure relates to electromechanical field, specifically to a driving device and a device manufacture method.

BACKGROUND

A driving device is a device which can perform the transmission and/or conversion of energy, such as a motor. Because of the reversibility between a generator and an electric motor, the "motor" mentioned herein may include both the electric motor and the generator, or may also be a reversible motor with dual functions. A wide variety of types of driving devices exist, but generally each of them has a stator and a mover. In the present disclosure, a moving part in the device is referred to as a mover, and a relatively fixed part is referred to as a stator. In some driving devices, the mover and the stator are connected by a deformable connection member, a simple example of which is the linear voice coil motor (VCM) which is widely used in the optical field, such as in an auto focus module of a camera of a cell phone.

The basic structure of a voice coil motor is shown in FIG. 1, which generally includes a stator 11, a mover 12 and a spring 13 acting as the deformable connection member. The spring connects the mover and the stator. A load (not shown) is fixedly mounted at the mover. In FIG. 1, the stator is a permanent magnet and a driving coil 121 is wound on the mover. After the driving coil is supplied with power, the mover is linearly moved under the action of the magnetic field of the stator. A movement of the mover in an opposite direction may be achieved by supplying a reverse current to the driving coil or utilizing the restoring force of the spring. In other examples, it is also possible that the mover is a permanent magnet and the driving coil is a part of the stator.

The voice coil motor with the structure described above may precisely position the location of the load (for example, move a focus lens to a desired position) by the balance between the electromagnetic force generated by the driving coil and the elastic force of the spring. In general, the elastic force of the spring is proportional to the displacement thereof in a working range, which leads to that the larger the displacement of the mover, the larger the electromagnetic force required, and the larger the current of the driving coil. When the mover needs to be kept at a fixed position (for example, a position for focusing) for a long time, the current of the driving coil needs to be maintained for a long time, which leads to a larger static holding power consumption of the voice coil motor. For the above reasons, the voice coil motor is generally suitable for a short travel application, such as focusing. However, for a long travel application (such as zooming), it is difficult to be achieved by the voice coil motor due to the excessive power consumption.

SUMMARY

According to an aspect of the present disclosure, a driving device is provide, which may include a stator, a mover and a deformable connection member. The mover may be connected with the stator through the deformable connection member. In the case that an exogenous driving force has not been applied, the deformable connection member is kept at a force balance position x0. The forces acting on the deformable connection member may include a deformation force of the deformable connection member and a first native force opposite to the deformation force in direction. The exogenous driving force may drive the mover or the deformable connection member to deform such that the position of the mover with respect to the stator is changed.

According to another aspect of the present disclosure, a device manufacture method is provided, which may include manufacturing a stator, a mover and a deformable connection member. The mover may be connected with the stator through the deformable connection member. Before an exogenous driving force is applied, a first native force may be applied on the deformable connection member such that the deformable connection member is kept at a force balance position x0 under the action of the deformation force of its own and the first native force opposite to the deformation force in direction. And then, an exogenous driving force may drive the mover or the deformable connection member to deform such that the position of the mover with respect to the stator is changed.

In the driving device according to the present disclosure, because the driving device maintains balance under the action of a pair of forces which do not consume external energy, i.e. the deformation force of the deformable connection member and the first native force, only small exogenous driving force is required when the driving device is working in vicinity of the balance point. Therefore the power consumption is reduced and the utilization efficiency of the exogenous driving force is increased.

The specific embodiments of the present disclosure will be described in details in following with reference to the drawings

DETAILED DESCRIPTION

Figure 1:
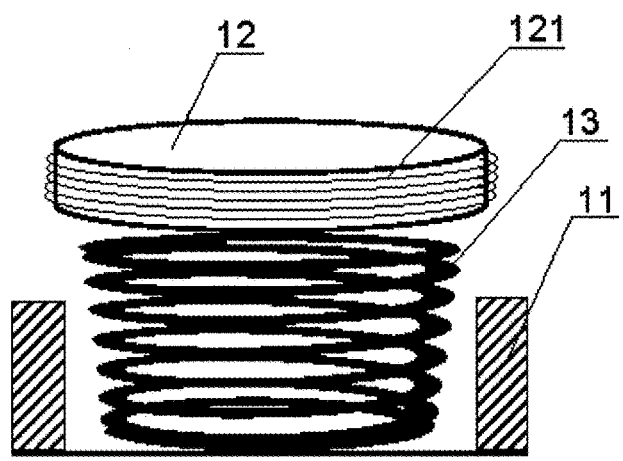
FIG. 1 is a schematic view of the structure of an existing voice coil motor.
Figure 2:
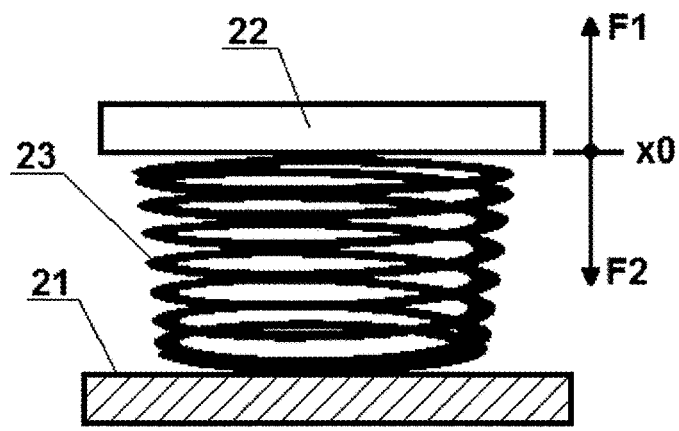
FIG. 2 is a schematic view of an equivalent structure of the driving device according to the present disclosure.

An equivalent structure of a driving device according to an aspect of the present disclosure is shown in FIG. 2, which may include a stator 21, a mover 22 and a deformable connection member 23. The mover may be connected with the stator by the deformable connection member. In general, the deformable connection member shown in FIG. 2 may be a stereo helical spring. In specific embodiments, a variety of deformable connection members with different forms may be used according to actual needs, as long as they can provide forces which are positively related to the deformation. For example, the deformable connection member may be a spring or an elastic sheet which may generate an elastic force based on an elastic deformation.

In the case that an exogenous driving force has not been applied, the deformable connection member may be kept at a force balance position x0. The forces acting on the deformable connection member may include a deformation force F1 of the deformable connection member and a first native force F2 opposite to the deformation force in direction.

The exogenous driving force is applied to drive the deformable connection member to deform such that the position of the mover with respect to the stator is changed. The exogenous driving force may be a force generated by consuming an external energy. The external energy mentioned herein may include natural energy, such as water energy, wind energy, tidal energy or solar energy, etc., and may also include converted energy, such as electrical energy or mechanical kinetic energy. The exogenous driving force may be implemented as an action of the external energy directly (for example, a water force or wind force may be directly acted on a force receiving member of the driving device to generate a thrust force or a pressure) or indirectly (for example, a mechanical force may be transferred to the force receiving member by a transmission to obtain a transmission mechanical force) on the driving device. The exogenous driving force may also be a force generated by a conversion of the energy form of the external energy, such as a electromagnetic force or an electro-generating mechanical force obtained by converting the electrical energy into the mechanical energy.

The deformation force may be a force which is positively related to the deformation of the deformable connection member, and the first native force may be a force which previously objectively exists without the consumption of the external energy. The first native force may be a variety of forms, such as an attractive or repellent magnetic force between magnets, a gravity, a deformation force generated by a preset deformation, a pressure of a preset fluid or gas or an electric field force (for example, an attractive or repellent electrostatic force between electric charges with opposite or same polarity, or an electric field force generated by a magnetic field, etc.). The first native force may be related to the position of the mover with respect to the stator (the position of the mover with respect to the stator generally represents the deformation of the deformable connection member), but is opposite to the deformation force in direction. In order to save energy, besides being opposite to the deformation force of the deformable connection member in direction, the first native force preferably is positively related to the deformation of the deformable connection member (for example, k2>0 as described below). A person skilled in the art will understand that the driving device can be correspondingly configured according to the type of the first native force to be used (for example, arranging suitable magnets or electric charges) to generate the required first native force.

Therefore, according to another aspect of the present disclosure, a device manufacture method is provided. The method may include manufacturing a stator, a mover and a deformable connection member by which the mover is connected with the stator, and applying a first native force to the deformable connection member before an exogenous driving force is applied such that the deformable connection member is kept at a force balance position x0 under the action of the deformation force of its own and the first native force opposite to the deformation force in direction.

For simplicity, the relevance factor between the deformation force and the deformation is referred to as variation factor k1, and the relevance factor between the first native force and the deformation position is referred to as variation factor k2. In general, in the vicinity of the force balance position x0, the deformation relation of the deformation force F1 and the first native force F2 may be simplistically expressed as:

$$F1=k1*x,$$

$$F2=F0+k2*x,$$

Where x is a position variable which coordinates the position where the deformation of the deformable connection member is zero as the origin (it is obvious that x represents the deformation at the same time). F0 is the magnitude of the first native force acting on the deformable connection member at the position where the deformation is zero. k1 may be a constant (for example, in the case that the spring is working in a linear region) or a variable value upon the position (for example, in the case that the spring is working in a non-linear region). Similarly, k2 may be a constant or a variable value. k1 is opposite to k2 in direction and has the same sign with k2.

Thereby, the force balance position x0 of the deformable connection member under the action of F1 and F2 may be obtained:

$$F0+k2*x0=k1*x0,$$

$$x0=F0/(k1-k2),$$

It can be seen that when the driving device is working in the vicinity of the force balance position x0, the equivalent variation factor of the deformable connection member which needs to be overcome by the exogenous driving force is merely (k1−k2), which is smaller than the variation factor k1 when the first native force is not applied. Therefore, the energy consumption is reduced. In general, k1 is larger than k2. Of course, it is also possible that k2 is larger than k1 (x0 will equal to the maximum deformation, and the exogenous driving force will be used to withstand the difference between the first native force and the maximum deformation force of the deformable connection member), as long as k2−k1<k1, which will similarly reduce the energy consumption of the exogenous driving force.

In a preferred embodiment, the force balance position x0 may be located at one of or between the two endpoints of the working range of the deformable connection member to keep the zero energy consumption in corresponding working state. The working range of the deformable connection member herein may refer to the travel range [xa, xb] of the mover. For most applications, x0 may be preferably set as xa or xb or (xa+xb)/2, which may specifically be determined according to the pattern of motion of the mover and the goal of optimization.

A controllable device can be manufactured according to the device manufacture method of the present disclosure, in which the exogenous driving force may act as a control input and the deformation of the deformable connection member or the effects caused by the deformation may act as output or state variables being controlled. Several specific embodiments will be exemplarily described in following.

Embodiment 1.1

A method for manufacturing a variable capacitor is provided. The stator and the mover may include a first electrode and a second electrode which have electric charges with opposite or same polarity, respectively. The deformable connection member may be a spring leaf. The first native force may include the electrostatic attraction force or repelling force between the first electrode and the second electrode. A piezoelectric ceramics or memory metal may further be provided between the stator and the mover and the exogenous driving force may include the deformation force generated by the piezoelectric ceramics or memory metal after power is supplied thereto. The spring leaf may be made from high dielectric constant material and be applied with an insulation coating on the outer surface thereof. Or, the spring leaf may be integrated with the piezoelectric ceramics or memory metal.

The first native force may be an electrostatic force, which will need to be supplemented only when a leakage exists. The external energy is substantially not consumed. A driving device (variable capacitor) manufactured according to the methods described above is shown in FIG. 3, in which a negative pole metal sheet 311 acts as the stator and a positive pole metal sheet 32 acts as the mover, and the piezoelectric ceramics sheet or memory metal 312 and the spring leaf 33 between the metal sheets act as the deformable connection member.

When a relatively high voltage is previously applied to the positive pole and negative pole metal sheets, an attraction force (the first native force) will be generated between the positive pole metal sheet and the negative pole metal sheet. The attraction force will increase upon the reduction of the distance between the two sheets and satisfy the requirement of k1−k2<k1. When a voltage is applied to the piezoelectric ceramics or memory metal, a deformation will be generated and thereby a thrust force (the exogenous driving force) will be generated to change the positions of the positive and negative pole. Due to the pre-applied electrostatic force, only the difference between the elastic force of the spring and the electrostatic force (i.e. (k1−k2)*x) needs to be withstood when the piezoelectric ceramics or memory metal is applied with a voltage.

Embodiment 1.2

A method for manufacturing a zoom lens is provided. The stator and the mover may include a first electrode and a second electrode which have electric charges with opposite or same polarity, respectively. The deformable connection member may be a spring leaf. The first native force may include the electrostatic attraction force or repellent force between the first electrode and the second electrode. The stator may be further provided with a piezoelectric ceramics or memory metal and the exogenous driving force includes the deformation force generated by the piezoelectric ceramics or memory metal after power is supplied thereto. The mover may be hollow and a focus or zoom lens group may be installed at the interior of the mover.

Figure 3:
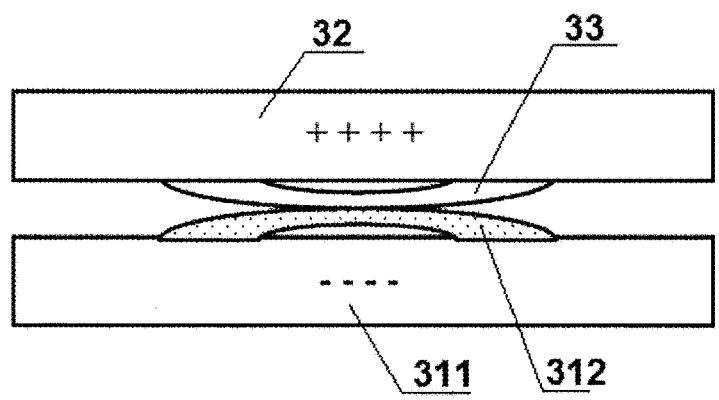
FIG. 3 is a schematic view of the structure of the variable capacitor of embodiment 1.1.
Figure 4:
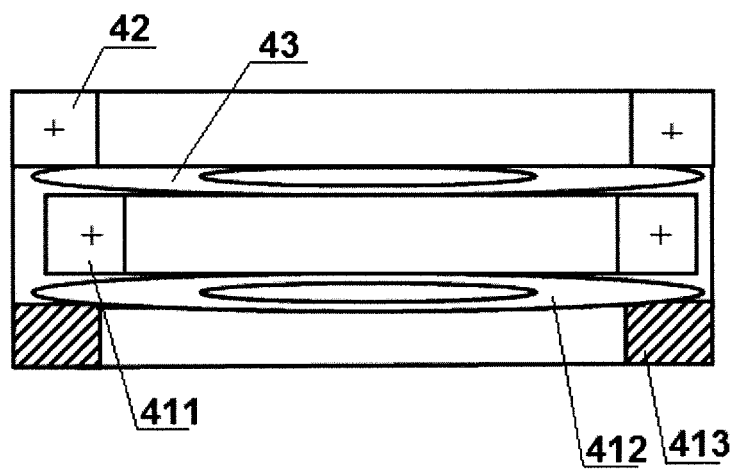
FIG. 4 is a schematic view of the structure of the zoom lens of embodiment 1.2.

A driving device (zoom lens) manufactured according to the methods described above is shown in FIG. 4, which is similar to that shown in FIG. 3. A support member 413 and a positive pole metal sheet 411 act as the stator, the other positive pole metal sheet 42 acts as the mover, and a piezoelectric ceramics sheet or memory metal 412 and a spring leaf 43 between the two positive pole metal sheets act as the deformable connection member. In compare with FIG. 3, the difference is that a pair of electrodes with the same polarity is used such that the first native force become a repellent force from a attraction force, and that one electrode is moved to a position between the piezoelectric ceramics or memory metal and the spring leaf such that the piezoelectric ceramics sheet presses the spring leaf by pressing the positive pole metal sheet.

In the embodiment 1.1 and the embodiment 1.2 described above, the spring leaf may be integrally formed with the piezoelectric ceramics or memory metal.

Embodiment 1.3

A method for manufacturing a natural energy generator is provided. The mover may include a first magnet which may be a permanent magnet. The deformable connection member may be a spring or a coil spring. The material of the coil spring may include conductive materials. The coil spring may act as an excitation coil. The mover may act as the mover of the generator or may be used to drive the mover of the generator. The exogenous driving force may include an external force acting on the mover. The external force may be obtained from a natural energy. The first magnet may be arranged on a curved slope. The first native force may include a component of the gravity of the first magnet in a direction opposite to the direction of the elastic force of the coil spring. Because the variation factor of the gravity over position in a free state is very small, the curved slope is used to increase the variation factor of the component of the gravity in the direction opposite to the direction of the elastic force of the coil spring.

Figure 5:
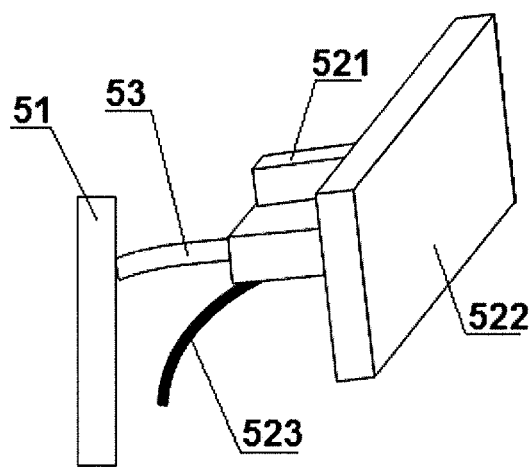
FIG. 5 is a schematic view of the structure of the natural energy generator of embodiment 1.3.

A driving device (natural energy generator) manufactured according to the methods described above is shown in FIG. 5. A fixation wall 51 may act as the stator and may be made from a permanent magnet. A magnet 521 and a thrust plate 522 fixed on the magnet 521 may act as the mover, be placed on the curved slope 523, and move along the curve slope under the impact of wind or water. A spring or coil spring 53 may act as the deformable connection member. The spring or coil spring 53 may merely transfer the magnetic force provided by the fixation wall of the permanent magnet, or may also act as an excitation coil to strengthen the magnetic force. When the driving device is used as a generator, the spring may restore the mover and increase the utilization efficiency of the water and the wind by a pre-balance with the gravity of the mover. At the vicinity of the pre-balance point x0, only a small external force is needed to destroy the balance to move the mover and thereby bring corresponding generating coils to move.

Figure 6:
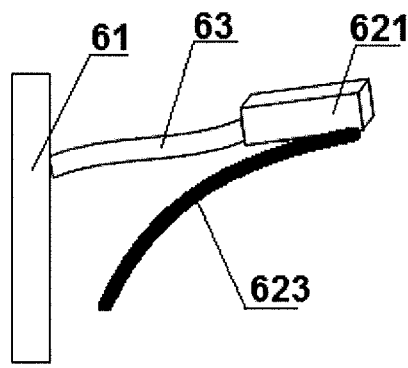
FIG. 6 is a schematic view of the structure of the electric motor of embodiment 1.3.

The structures described above may also suitable for an electric motor. Referring to FIG. 6, a fixation wall 61 may act as the stator, which may be made from a permanent magnet or non-magnetic materials. The mover may include a first magnet 621 arranged at a curved slope 623. The first magnet may be a permanent magnet. The deformable connection member 63 may be a coil spring, the materials of which may include conductive materials. The coil spring may act as the coil for driving the mover. The exogenous driving force may include the electromagnetic force generated by the coil spring for driving the mover. The first native force may include the component of the gravity of the first magnet in a direction opposite to the direction of the elastic force of the coil spring. Because a pre-balance is achieved between the component of the gravity of the first magnet and the elastic force of the spring, in the vicinity of the force balance point x0, the coil spring can drive the first magnet to reciprocate and thereby bring the mechanical structures which need to be driven to move using a small current.

Figure 7:
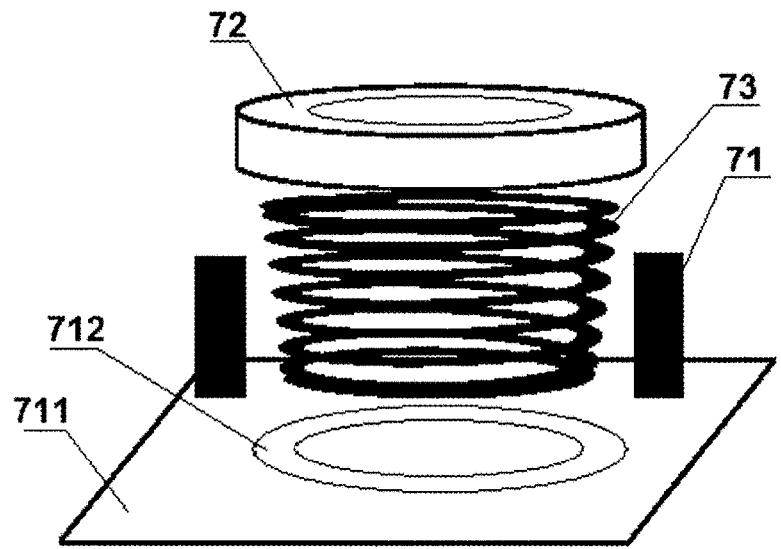
FIG. 7 is a schematic view of an equivalent structure of the voice coil motor according to the present disclosure.

The driving device manufactured according to the methods of the present disclosure may also be a voice coil motor, an equivalent structure of which is shown in FIG. 7. The voice coil motor may include a stator 71, a mover 72 and an elastic member 73. The mover may be connected with the stator by the elastic member acting as the deformable connection member. In general, the elastic member shown in FIG. 7 may be a stereo helical spring. In practice, the elastic members with other forms may also be used, such as a plane spring leaf manufactured by a metal etching process, etc.

The assemblies described above include at least two magnets and at least one driving coil. Where:

(1) with Respect to the Two Magnets—the First Magnet and the Second Magnet

One of the first magnet and the second magnet may be a permanent magnet, and the other may be a permanent magnet or a magnetism receptor. The first native force may include the attractive or repellent magnetic force F2 between the first magnet and the second magnet. The permanent magnet mentioned herein may refer to the material which has magnetism per se, and the magnetism receptor may refer to the material which has no magnetism per se, but can be attracted or repelled by the permanent magnet, such as iron, steel and other materials with high permeability. The first magnet may be arranged at the mover and may be hollow. The loads (such as the focus or zoom lens group) can be installed at the interior of the first magnet. The second magnet may be arranged at the stator or the elastic member. Obviously, in the case that the VCM is not supplied with power, an attractive or repellent magnetic force previously exists between the first magnet and the second magnet.

Because the mover is connected with the stator by the elastic member, the forces acting on the elastic member include the elastic force F1 of the elastic member and the magnetic force F2 between the first magnet and the second magnet. For simplicity, in the case that the VCM further includes other magnetic components, the components may be equivalent to parts of the first magnet or the second magnet based on the relative relation of the magnetic components with respect to the stator and the mover. Of course, other forces may also be included, such as the friction force acting on the elastic member in its travel and the gravity introduced by the direction of placement, etc. When actually determining the balance position of the elastic member, all of the forces acting on the elastic member should be considered. However, since the forces except F1 and F2 are relatively small and less affected by the change of the position, F1 and F2 will be mainly considered when discussing the force balance of the elastic member in following.

Based on the analysis about the force balance position x0 above, it will be seen that, representing the elastic force as $F1=k1*x$ (where k1 is the elastic force factor of the elastic member and x is the deformation position of the elastic member, i.e. the distance by which the elastic member deviating from the free position) and representing the magnetic force as $F2 F0+k2*x$ (where F0 is the force acting on the elastic member which is generated by the attraction or repelling between the first magnet and the second magnet when the elastic member is in a free balance position (i.e. the balance position where no external force acts on the elastic member) (the relation between the magnetic force and the position is complex and basically may be considered as being related to the reciprocal of the square of the distance between the centers of two bodies which are attracted or repelled with each other. However, according to the Taylor theorem, any continuous function, at a fixed point, can be approached using linear functions. Therefore, the relation between the magnetic force and the position can be simplified as the formula above. When the relation between the magnetic force and the position is represented using the formula above, k2 is referred to as magnetic force factor)), the force balance position x0 of the elastic member under the action of F1 and F2 can be obtained:

$$F0+k2*x0=k1*x0,$$

$$x0=F0/(k1-k2),$$

It is obvious that F1 is opposite to F2 in direction. Furthermore, when k1 is larger than k2, the elastic member will maintain balance with the magnetic force in the linear region and not be compressed (or stretched) into the non-linear region. Of course, it is also possible that the elastic member is compressed or stretched into the non-linear region.

It can be seen from above that the elastic member can be kept at the force balance position x0 in the case that no power is supplied (no power consumption) as long as the first magnet, the second magnet and the elastic force factor of the elastic member are appropriately arranged according to the relation described above. When the force balance position x0 is set as being located at one of or between two endpoints of the working range of the elastic member, the maintenance of zero power consumption in corresponding working state can be achieved. The working range of the elastic member mentioned herein may refer to the travel range [xa, xb] of the mover. For most applications, x0 may be preferably set as xa or xb or (xa+xb)/2, which may specifically be determined according to the pattern of motion of the mover. For example, in the case that the mover is located at the position xa or xb in most instances, x0 may be set as xa or xb such that in most instances the power consumption of the VCM is zero; in the case that the mover needs to cyclically reciprocate in [xa, xb] in most of the time, x0 may be set as (xa+xb)/2 such that the maximum displacement apart from the balance position generated by the VCM is (xa+xb)/2, which minimizes the driving current required.

Besides being able to maintain zero power consumption at a certain working position, the VCM according the embodiments of the present disclosure can also have advantages when it move deviating from the force balance position x0. For a traditional VCM, a contradiction in design exists: the elastic force factor should be reduced in order to reduce the power consumption and increase the speed of the movement; however the reduction of the elastic force factor will result in increased oscillation such that the position of the loads cannot be fixed for a long time, and thereby the accuracy of the speed and displacement is reduced. While for the VCM according to the embodiments of the present disclosure, due to the existence of F2, what needs to be balanced by the driving coil is an equivalent spring with an elastic force factor of (k1−k2) when the elastic member is moved in the vicinity of x0. Therefore, in the case that the effect of the gravity and the friction force is ignored, with the same structure sizes, in order to move the same distance, the ratio of the current and power consumption required by the VCM according to the embodiments of the present disclosure and the traditional VCM is (k1−k2)/k1; while the oscillation (or damping) factor of the elastic member is still determined by k1. Therefore, not only the power consumption is reduced, but also the accuracy of the displacement is ensured.

(2) with Respect to the Driving Coil

The driving coil may be arranged at the mover, the stator or the elastic member, as long as at least one permanent magnet is not arranged at the same component with the driving coil. The exogenous driving force may include the electromagnetic force generated by the driving coil for driving the mover to move. For example, in the case that the stator includes the permanent magnet, the driving coil may be arranged at the mover or the elastic member. In the cast that the mover includes the permanent magnet, the driving coil may be arranged at the stator or the elastic member. Of course, the driving coil may be arranged at both of the components. For example, in the case that the mover includes the permanent magnet, the driving coil may be arranged at both the stator and the elastic member.

There may be two preferred arrangements of the driving coil for the VCM according to the embodiments of the present disclosure:

According to one preferred arrangement, the driving coil is arranged at the elastic member, i.e. is integrated with the elastic member to form a coil spring. The materials of the coil spring include conductive materials. The coil spring acts as the coil driving the mover to move. The coil spring can be connected to a circuit through conductive pins at the end and be fixedly connected with the substrate of the stator. Since the spring is generally made from steel the conductivity of which is not very good, nickel, copper, silver or other alloy materials with good conductivity can be plated on the outer surface of the steel spring to increase the conductivity. Furthermore, when acting as the driving coil, the spring needs to be insulated at the surface thereof. Therefore insulation materials may be coated on the outer surface of the spring. For example, insulating paint may be applied on the outer surface of the spring.

Figure 8:
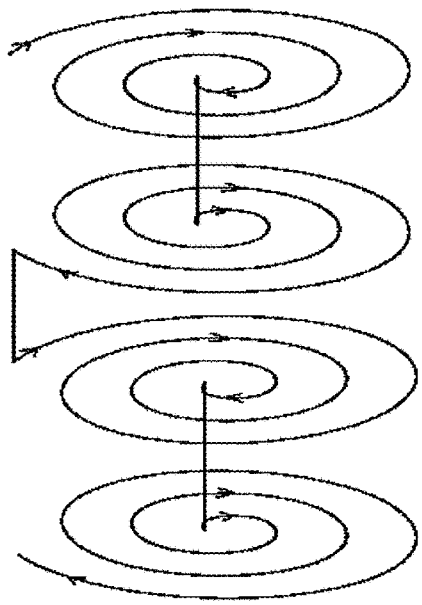
FIG. 8 is a schematic view of the winding mode of a four-layer printed circuit according to the present disclosure.
Figure 9:
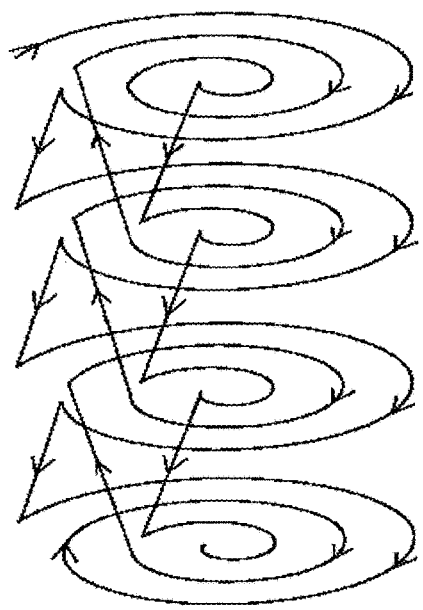
FIG. 9 is a schematic view of the winding mode of another four-layer printed circuit according to the present disclosure.

According to another arrangement, a separate first coil is used as the driving coil. The first coil is made from printed circuit and generally may be arranged at the stator. The substrate of the printed circuit can act as the substrate of the stator (as shown in FIG. 7, in which the printed circuit acting as the substrate 711 of the stator is provided with the first coil 712). The printed circuit may be formed on a hard board, such as a printed circuit board (PCB), or may also be formed on a soft board, such as a flexible printed circuit (FPC) board. Each of the PCB or FPC may be provided with a single layer of circuit, or may be formed from two or more layers of circuit. The printed circuit may be made of electrically conductive materials, for example, be made of conventional copper or other metals and the composites thereof. In some embodiments, the printed circuit may be made of superconducting materials, thereby the copper loss and heating of the motor can be significantly reduced and the performance and reliability of the motor can be increased. For example, the graphane and the stanene composite superconducting material recently proposed (professor Zhang Shoucheng, Stanford University) can be used. A stanene single-layer lattice composite film made from the stanene composite superconducting material has superconductivity at room temperature at its edges. The use of this superconducting film in the manufacture of the PCB or the FPC will lead to superior performance. Based on the mature technologies for manufacturing printed circuit, the structure of the printed circuit may be arranged according to predetermined coil configuration, and the winding required may be obtained by one single unit (one PCB or FPC) or by splicing a plurality of PCBs or FPCs (the wires which are located at the ends and need to be connected may be welded). Referring to FIG. 8 and FIG. 9, two typical arrangements of the printed circuit are shown, in which the arrows indicate the directions of the currents. A person skilled in the art will readily understand that the arrangement and/or the splicing mode of the printed circuit can be correspondingly designed according to the configuration required by the coil. In FIG. 8, a planar spiral winding overlapped in axial direction is shown, where the wire is spirally wound in a single layer first, and then enters into another layer through a perforation and continues to be spirally wound. The spiral circuit in each layer may be one single-layer PCB or FPC, or be one layer of a multi-layer PCB or FPC. The layers are connected by conductive vias (the same below). In FIG. 9, a layered 3D spiral winding nested in radial direction is shown, where the wire is spirally wound between different layers first, and then is three-dimensionally spirally wound from inside to outside (or from outside to inside), which can be regarded as a nesting of several vertical coils with different diameters.

Figure 10:
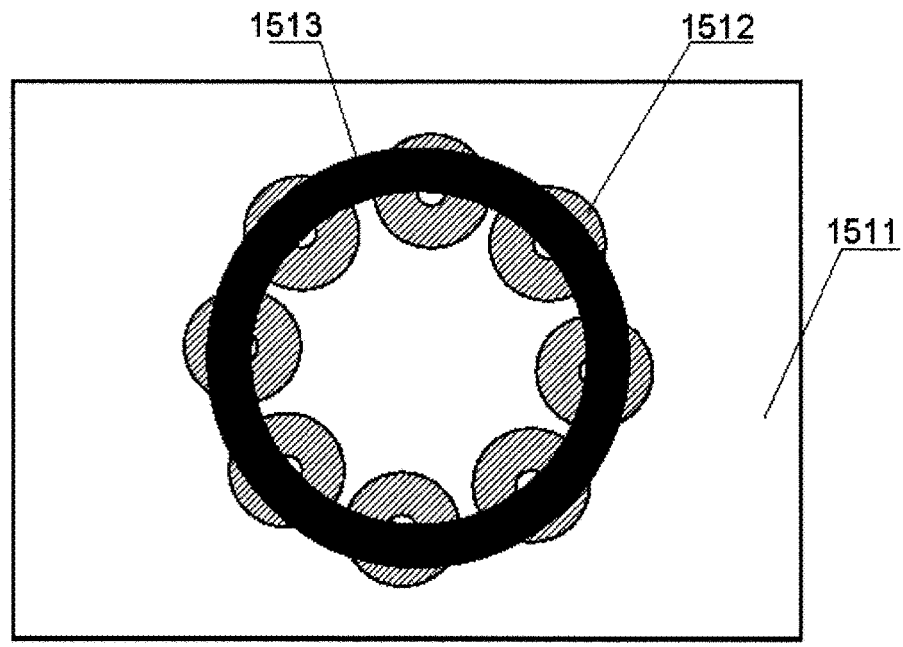
FIG. 10 is a schematic view of a multiple-ring chained coil according to the present disclosure.

The first coil may be a concentric spiral ring coil, as shown in FIG. 7. This coil has large magnetic flux leakage and therefore the driving efficiency is low. In order to further improve the efficiency of the driving coil, the present disclosure further proposes a preferred coil—multiple-ring chained coil. Referring to FIG. 10, the first coil 1512 is formed by combining a plurality of small spiral coils. With the coil having this configuration, a large electromagnetic force may be generated using small current, and thereby the power consumption of the VCM can be further reduced. The small coils in the multiple-ring chained coil may be connected in parallel or in series, or may be connected in parallel according to groups or in series according to groups. The switch control of these small coils may be separately achieved, or currents with different magnitude and even different directions may be supplied to these small coils, such that a precise step control can be achieved independent of the voltage division precision of the voltage.

One or both of the coil spring and the first coil made from the printed circuit described above may be arranged. In the case that both of them are arranged, one of them is used or both of them are simultaneously used, which may specifically determined according to the magnitude of the driving force required. For example, for a VCM with small sizes and loads, only the coil spring is used. For the VCM which has large load or requires a long travel, the coil spring alone may not be able to generate an electromagnetic force large enough. Therefore the first coil may be used together.

In the case that the stator include a first positioning sleeve made from permanent magnetic materials or magnetism reception materials, the first coil may be arranged on the first positioning sleeve or at the bottom of the first positioning sleeve. For example, as shown in FIG. 10, the first coil 1512 may be formed on the substrate 1511 which located at the bottom of the first positioning sleeve 1513. Utilizing the magnetism or the ability for magnetism reception of the first positioning sleeve, the electromagnetic force generated by the first coil can be efficiently transferred to the first magnet arranged at the mover. Of course, in the case that the first coil is used in conjunction with the coil spring, the first coil may also be arranged at the bottom of the coil spring.

The VCM according to the present disclosure will be described with reference to specific embodiments in following, where the features which have already been described above (such as the arrangement of the force balance position x0) will not be described again.

Embodiment 2.1

Figure 11:
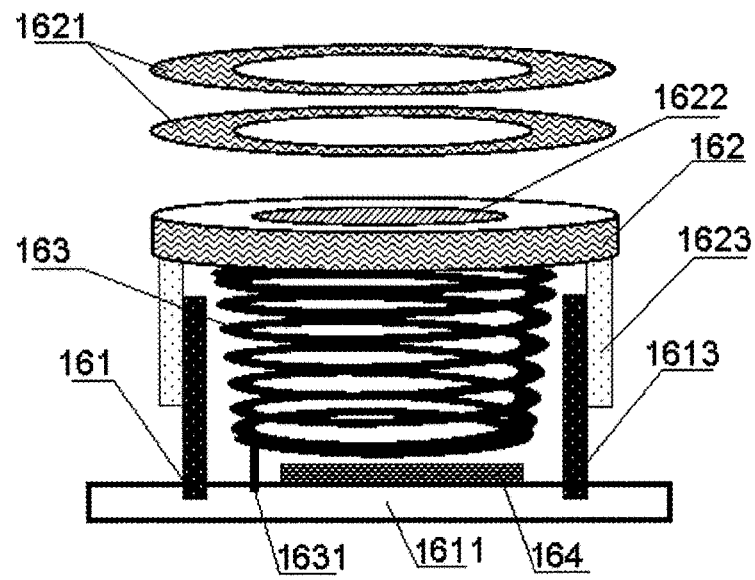
FIG. 11 is a schematic view of the structure of the voice coil motor of embodiment 2.1.

An embodiment of the VCM according to the present disclosure is shown in FIG. 11, which may include a stator 161, a mover 162 and an elastic member 163. The mover may include a permanent magnetic ring acting as the first magnet. The stator may include a first positioning sleeve 1613 made from iron or steel which acts as the second magnet and a substrate 1611. The elastic member may be a copper plated steel spring, the surface of which is applied with insulating paint. The bottom of the elastic member may be fixed to the substrate 1611 and connected with circuits through pins 1613. The top of the elastic member may be bonded with the permanent magnetic ring of the mover. Since the elastic member is made from steel and is magnetism reception material per se, it can be equivalent into the second magnet and considered as a whole unit therewith when determining the force balance position of the elastic member.

In the present embodiment, the permanent magnetic ring of the mover is hollow and a focus or zoom lens group may be installed therein. In the present embodiment, because the coil spring which integrates the coil and the spring is used, no additional driving coil is added. Therefore, the present embodiment is suitable for focus with short travel. Thus a focus lens group 1622 is used in the present embodiment. The permanent magnetic ring of the mover may be formed by bonding and superposing a plurality of magnetic ring slices 1621. During the manufacture process, the magnetic ring slice is added one by one until the force balance position x0 of the elastic member is located at a desired working position such as, for the focus application, at a working position where the lens is focused at infinity. In order to fix the lens group better, the mover may include a lens barrel 1623 which is used to fix the magnetic ring. The lens barrel may be made from, for example, plastic materials, and be sleeved at outside of the first positioning sleeve to ensure the stability of the movement of the lens along the axial direction. The substrate of the stator may be a PCB or a FPC, on which a sensitive chip 164 and corresponding circuit may be mounted. Thereby a compact auto focus lens module driven by a VCM can be obtained.

In the present embodiment, the coil spring 163 is installed at the interior of the first positioning sleeve 1613 and generates a magnetic force when being supplied with power. The first positioning sleeve is made from magnetism reception material and will be attracted by the coil spring. Because the outer diameter of the coil spring is close to the inner diameter of the first positioning sleeve, the coil spring will be deformed under the action of the magnetic force and abut against the inner wall of the first positioning sleeve, and thereby a friction is generated to increase the damping factor of the spring such that the spring can be stabilized quickly when the position of the lens is adjusted. Furthermore, the close abutment of the coil spring with the first positioning sleeve further enables the transmission of the magnetic force of the coil through the first positioning sleeve such that the electromagnetic efficiency of the coil can be further increased. Of course, in other embodiments, it may also be possible that the coil spring is sleeved at outside of the first positioning sleeve and abuts against of the outer wall of the first positioning sleeve when it is supplied with power.

In the present embodiment, because the force balance position of the coil spring is located at the position where the lens is focused at the infinity, the VCM need not to be supplied with power when the lens module is in a preview work state. Only when a photo-taking or a video-taking is begun such that the lens needs to perform the focus operation, the VCM begins to work and consume power.

Embodiment 2.2

Figure 12:
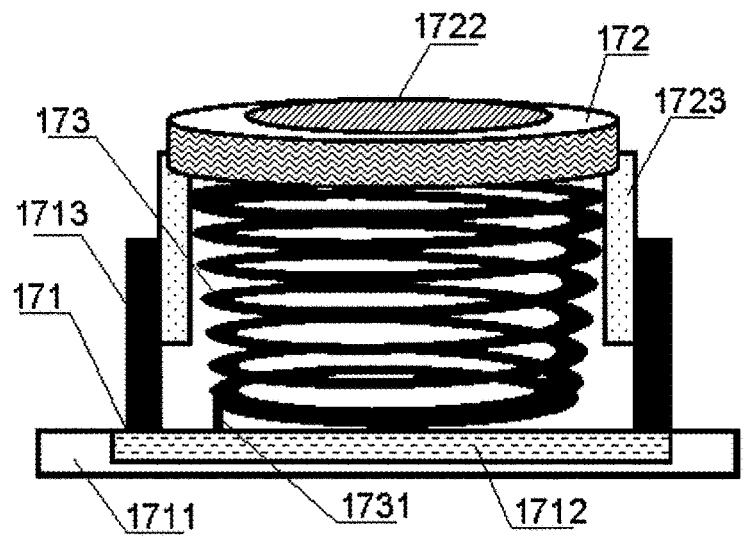
FIG. 12 is a schematic view of the structure of the voice coil motor of embodiment 2.2.

Another embodiment of the VCM according to the present disclosure is shown in FIG. 12, which may include a stator 171, a mover 172 and an elastic member 173. The mover may include a permanent magnetic ring acting as the first magnet. The stator may include a first positioning sleeve 1713 made from iron or steel which acts as the second magnet and a substrate 1711. The elastic member may be a copper plated steel spring, the surface of which is applied with insulating paint. The bottom of the elastic member may be fixed to the substrate 1711 and connected with circuits through pins 1713. The top of the elastic member may be bonded with the permanent magnetic ring of the mover. In compare with the embodiment 2.1, the main difference is that besides the coil spring being used, a first coil 1712 is further provided on the substrate of the stator in order to provide larger driving force.

In the present embodiment, the first coil may be a multiple-ring chained coil made from printed circuit and be arranged at the bottom of the first positioning sleeve, and can provide a strong electromagnetic force together with the spring coil. Therefore, the VCM according to the present embodiment is suitable for zooming requiring a long travel. The permanent magnetic ring of the mover is hollow and a zoom lens group 1722 may be installed therein. In order to fix the lens group better, the mover may include a lens barrel 1723 which is used to fix the magnetic ring. The lens barrel may be made from, for example, plastic materials and be installed at the interior of the first positioning sleeve to ensure the stability of the movement of the lens along the axial direction.

In the present embodiment, the force balance position x0 of the elastic member may be the position where the lens is completely retracted, or may be the position where the lens has a 1 time zoom. In the case that the force balance position is the position where the lens is completely retracted (for example, the position where the lens is flush with the body), power supply is not needed and the lens will automatically retract, but correspondingly a large holding current is required when the lens is working. In the case that the force balance position is the position where the lens has a 1 time zoom, the power consumption occurs only when the zoom factor exceeds 1, but the retraction of the lens may need to be achieved manually. For example, the lens is manually pressed and a lock is used to keep the lens in the retraction position.

Embodiment 2.3

Figure 13:
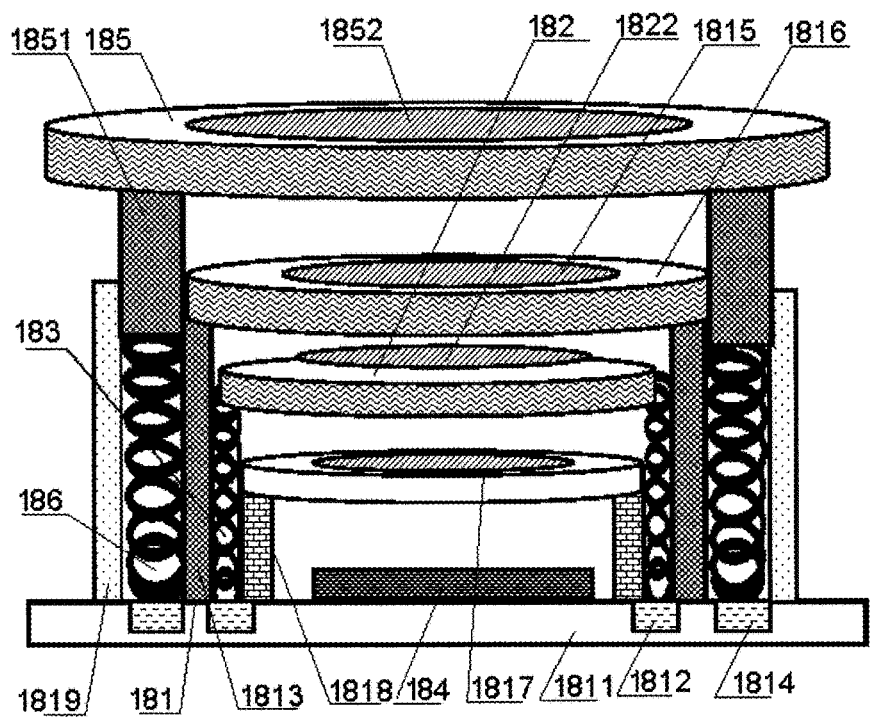
FIG. 13 is a schematic view of the structure of the voice coil motor of embodiment 2.3.

Another embodiment of the VCM according to the present disclosure is shown in FIG. 13, which may be formed by sleeving a group of stators, two groups of movers and elastic members. One group of movers and the elastic members may be sleeved at inside of the stator, and the other group may be sleeved at outside of the mover. Specifically, the VCM may include a common stator 181, a first mover 182, a first elastic member 183, a second mover 185 and a second elastic member 186. The first mover may include a permanent magnetic ring (which acts as the first magnet) and the second mover may include a permanent magnetic ring and a first zoom lens barrel 1851 which is used to fix the permanent magnetic ring. The first zoom lens barrel may be made from iron or steel and may act as the first magnet together with the permanent magnetic ring of the second mover. The stator 181 may include a first positioning sleeve 1813 made from iron or steel which acts as the second magnet, a PCB or FPC substrate 1811 and two groups of first coil 1812 and 1814 which are arranged at the bottom of the two elastic member, respectively. The two groups of coil may both be multiple-ring chained coil made of printed circuit. The first elastic member and the second elastic member may both be copper plated steel springs, the surfaces of which may be applied with insulating paint, and their bottoms may be fixed on the substrate 1811 and connected with circuits through pins (not shown). The top of the first elastic member may be bonded with the permanent magnetic ring of the first mover. The top of the second elastic member may drive the permanent magnetic ring of the second mover by. In other embodiments, the configuration of the driving coil may be adjusted according to the driving force required. For example, the first elastic member may merely be a spring, or the first elastic member is a coil spring while the driving coil 1812 arranged at its bottom is canceled, etc.

In the present embodiment, the permanent magnetic ring of the first mover may be hollow and a first focus lens group 1822 may be installed therein. The permanent magnetic ring of the second mover may be hollow and a first zoom lens group 1852. In order to achieve a better optical design, a fixed second zoom lens group 1815 may further be provided between the first focus lens group 1822 and the first zoom lens group 1852. The second zoom lens group 1815 may be fixed on the first positioning sleeve through a hollow magnetic ring 1816 which may be equivalent to a part of the second magnet. And, a second focus lens group 1817 may be provided at inside of the first focus lens group 1822 and be fixed on the substrate 1811 through a second positioning sleeve 1818 which may be made from plastic materials. In order to protect the coil spring acting as the second elastic member, a lens protection barrel 1819 fixed on the substrate may further be provided at outside of the first zoom lens barrel. The lens protection barrel may be made from plastic materials.

By using the structure described above and then installing a sensitive chip 184 and corresponding circuit on the substrate, a very compact complete zoom lens assembly driven by a sleeved VCM may be obtained.

The inner wall of the first positioning sleeve abuts against the first elastic member driving the first focus lens and the outer wall abuts against the second elastic member driving the first zoom lens, such that the structure is simplified and miniaturized and has both abilities of zooming and focusing. The whole structure is simple and there is no difficult machining step.

The force balance position of the first elastic member and the second elastic member may be determined according to the magnetic force previously applied thereon and the balance position of the elastic force of its own, and may be set as the desired working position, respectively. For example, the force balance position of the first elastic member may be set as the working position of the lens in the review state, and the force balance position of the first elastic member may be set as the position of the lens with 1 time zoom.

In other embodiments, in the case that the optical design is simple, the fixed second zoom lens group and the second focus lens group may be omitted, such that the structures described above will be further simplified.

Embodiment 2.4

Figure 14:
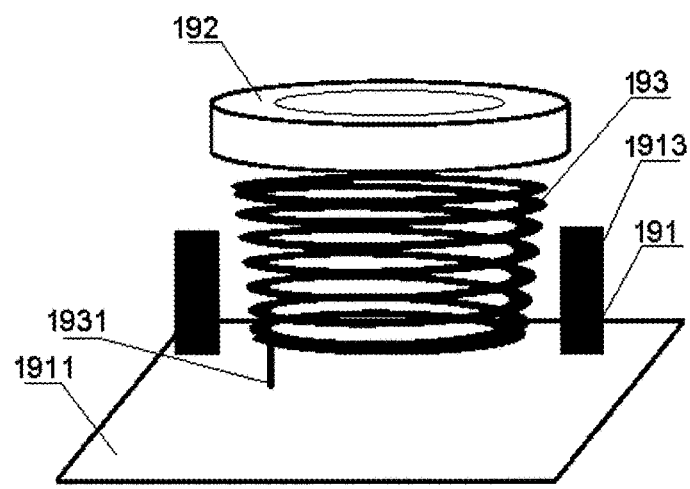
FIG. 14 is a schematic view of the structure of the voice coil motor of embodiment 2.4.

Another embodiment of the VCM according to the present disclosure is shown in FIG. 14, which may include a stator 191, a mover 192 and an elastic member 193. The mover may be connected with the mover through the elastic member. The mover may include a permanent magnetic ring acting as the first magnet. The elastic member may be a magnetic coil spring which integrates the coil, the spring and the magnet. The materials of the magnetic coil spring may include conductive materials for acting as the coil which drives the mover to move. The materials of the magnetic coil spring may also include permanent magnetic or magnetism reception materials for acting as the second magnet. For example, the magnetic coil spring may be a copper plated steel spring, the surface of which may be applied with insulating paint. The bottom of the magnetic coil spring may be fixed on a substrate 1911 and connected with circuit through pins 1931. The top of the magnetic coil spring may be bonded with the permanent magnetic ring of the mover.

In the present embodiment, because the elastic member acts as the driving coil, the spring and the second magnet at the same time, the stator may be made from non-magnetic materials. For example, the stator may include a PCB substrate 1911 and a plastic barrel 1913 fixed on the substrate.

In other embodiments, in order to improve the electromagnetic driving capability and increase the magnetic force previously applied, a positioning sleeve made from permanent magnetic or magnetism reception materials may be arranged, or the driving coil may be added, etc.

The principles and embodiments of the present disclosure have been described in the above with reference to specific examples. However, it should be understood that the embodiments described above are merely used to facilitate the understanding to the present disclosure, but should not be interpreted as limitations thereto. A variety of modifications to the specific embodiments described above can be made by a person ordinarily skilled in the art according the concepts of the present disclosure.

The invention claimed is:

1. A driving device, comprising: a stator, a mover and a deformable connection member, wherein the mover is connected with the stator through the deformable connection member and an exogenous driving force drives the mover or the deformable connection member to deform such that a position of the mover with respect to the stator is changed, and wherein:

when the exogenous driving force has not been applied, forces acting on the deformable connection member comprise a deformation force of the deformable connection member and a first native force which is keeping opposite to the deformation force in direction, and the deformable connection member is kept at a force balance position of the deformation force and the first native force;

wherein the force balance position is located at one of or between two endpoints of a working range of the deformable connection member;

wherein the mover comprises a first magnet, the first magnet is a permanent magnet, the deformable connection member is a coil spring, and materials of the coil spring comprises conductive materials which are used to act as a coil driving the mover to move;

the exogenous driving force comprises an electromagnetic force which is generated by the coil spring and used to drive the mover to move; and the first magnet is arranged on a curved slope, and the first native force comprises a component of a gravity of the first magnet in a direction opposite to a direction of an elastic force of the coil spring.

2. A driving device, comprising a stator, a mover and a deformable connection member, wherein the mover is connected with the stator through the deformable connection member and an exogenous driving force drives the mover or the deformable connection member to deform such that a position of the mover with respect to the stator is changed, and wherein:

when the exogenous driving force has not been applied, forces acting on the deformable connection member comprise a deformation force of the deformable connection member and a first native force which is keeping opposite to the deformation force in direction, and the deformable connection member is kept at a force balance position of the deformation force and the first native force;

wherein the force balance position is located at one of or between two endpoints of a working range of the deformable connection member, wherein the stator or the mover comprises a first magnet, the first magnet is a permanent magnet, the deformable connection member is a magnetic coil spring, materials of the magnetic coil spring comprise conductive materials and permanent magnetic or magnetism reception materials, and the permanent magnetic or magnetism reception materials of the magnetic coil spring is used to act as a second magnet;

the first native force comprises an attractive or repellent magnetic force between the first magnet and the second magnet; and the conductive materials of the magnetic coil spring is used to act as a coil which drives the mover to move, and the exogenous driving force comprises an electromagnetic force which is generated by the magnetic coil spring and used to drive the mover to move; or the conductive materials of the magnetic coil spring is used to act as a coil which drives the mover to move, the mover or the stator further comprises a first coil, and the exogenous driving force comprises electromagnetic forces which are generated by the first coil and the magnetic coil spring and used to drive the mover to move.

3. A driving device, comprising a stator, a mover and a deformable connection member, wherein the mover is connected with the stator through the deformable connection member and an exogenous driving force drives the mover or the deformable connection member to deform such that a position of the mover with respect to the stator is changed, and wherein:

when the exogenous driving force has not been applied, forces acting on the deformable connection member comprises a deformation force of the deformable connection member and a first native force which is keeping opposite to the deformation force in direction, and the deformable connection member is kept at a force balance position of the deformation force and the first native force;

wherein the force balance position is located at one of or between two endpoints of a working range of the deformable connection member, wherein the stator and the mover comprise a first electrode and a second electrode which have electric charges with opposite or same polarity, respectively, the deformable connection member is a spring leaf, the first native force comprises an electrostatic attraction force or repelling force between the first electrode and the second electrode, a piezoelectric ceramics or memory metal is further provided between the stator and the mover, and the exogenous driving force comprises a deformation force generated by the piezoelectric ceramics or memory metal after power is supplied thereto.

4. The device of claim 3, wherein the spring leaf is made from high dielectric constant materials and applied with an insulation coating on an outer surface thereof, or is integrated with the piezoelectric ceramics or memory metal.

5. A device manufacture method, comprising: manufacturing a stator, a mover and a deformable connection member, wherein the mover is connected with the stator through the deformable connection member, and wherein before an exogenous driving force is applied, applying a first native force to the deformable connection member such that the deformable connection member is kept at a force balance position under action of a deformation force of the deformable connection member itself and the first native force which is keeping opposite to the deformation force in direction, wherein the exogenous driving force is used to drive the mover or the deformable connection member to deform such that a position of the mover with respect to the stator is changed;

wherein the force balance position is located at one of or between two endpoints of a working range of the deformable connection member;

wherein at the force balance position, a variation factor k1 of the deformation force is larger than a variation factor k2 of the first native force.

6. The method of claim 5, wherein the method is a method for manufacturing a zoom lens, the stator and the mover comprise a first electrode and a second electrode which have electric charges with opposite or same polarity, respectively, the deformable connection member is a spring leaf, the first native force comprises an electrostatic attraction force or repellent force between the first electrode and the second electrode, a piezoelectric ceramics or memory metal is further provided between the stator and the mover, the exogenous driving force comprises a deformation force generated by the piezoelectric ceramics or memory metal after power is supplied thereto, and the mover is hollow and a focus or zoom lens group is installed at interior of the mover.

7. The method of claim 5, wherein the method is a method for manufacturing a natural energy generator, the mover comprises a first magnet, and the first magnet is a permanent magnet;

the deformable connection member is a spring or a coil spring, and materials of the coil spring comprise conductive materials which are used to act as an excitation coil;

the mover is used to act as a generator mover or drive a generator mover, the exogenous driving force comprises an external force acting on the mover, and the external force is obtained from a natural energy; and
the first magnet is arranged on a curved slope and the first native force comprises a component of a gravity of the first magnet in a direction opposite to a direction of an elastic force of the coil spring.

* * * * *